(12) United States Patent
Ding et al.

(10) Patent No.: US 11,128,036 B2
(45) Date of Patent: Sep. 21, 2021

(54) INTEGRATED ANTENNA UNIT, MULTI-ARRAY ANTENNA, TRANSMISSION METHOD AND RECEIVING METHOD OF SAME

(71) Applicant: TONGYU COMMUNICATION INC., Zhongshan (CN)

(72) Inventors: Can Ding, Zhongshan (CN); Haihan Sun, Zhongshan (CN); Zhonglin Wu, Zhongshan (CN); Samb Doudou, Zhongshan (CN); Yingjie Guo, Zhongshan (CN)

(73) Assignee: TONGYU COMMUNICATION INC., Zhongshan (CN)

( * ) Notice: Subject to any disclaimer, the term of this patent is extended or adjusted under 35 U.S.C. 154(b) by 0 days.

(21) Appl. No.: 16/478,950

(22) PCT Filed: May 12, 2017

(86) PCT No.: PCT/CN2017/084200
§ 371 (c)(1),
(2) Date: Jul. 18, 2019

(87) PCT Pub. No.: WO2018/205277
PCT Pub. Date: Nov. 15, 2018

(65) Prior Publication Data
US 2020/0044327 A1    Feb. 6, 2020

(51) Int. Cl.
*H01Q 1/38* (2006.01)
*H01Q 15/14* (2006.01)
(Continued)

(52) U.S. Cl.
CPC .............. *H01Q 1/38* (2013.01); *H01Q 15/14* (2013.01); *H01Q 21/24* (2013.01); *H01Q 23/00* (2013.01); *H04B 7/0413* (2013.01)

(58) Field of Classification Search
CPC .. H01Q 1/38; H01Q 1/50; H01Q 1/52; H01Q 15/14; H01Q 21/24; H01Q 21/29;
(Continued)

(56) References Cited

U.S. PATENT DOCUMENTS

| 2008/0111757 A1* | 5/2008 | Bisiules | H01Q 5/48 343/799 |
| 2016/0056527 A1* | 2/2016 | Pascolini | H01Q 9/42 343/702 |
| 2016/0226156 A1 | 8/2016 | So et al. | |

FOREIGN PATENT DOCUMENTS

| CN | 204011714 U | 12/2014 |
| CN | 204118242 U | 1/2015 |

(Continued)

OTHER PUBLICATIONS

Jan. 31, 2018 International Search Report issued in International Patent Application No. PCT/CN2017/084200.

*Primary Examiner* — Raymond R Chai
(74) *Attorney, Agent, or Firm* — Oliff PLC (57) ABSTRACT

An integrated antenna unit includes an integrated radiating element; a reflect board beneath the integrated radiating element without a direct contact therebetween; and an RF component device for processing signal of interest for a radio unit. The RF component device is placed beneath the integrated radiating element and on the reflecting board, and serves a support of a fixture structure of the radiating element to the reflecting board; whereby a space between the radiating element and the reflecting board can be efficiently used for the RF component device.

19 Claims, 6 Drawing Sheets

(51) Int. Cl.
*H01Q 21/24* (2006.01)
*H01Q 23/00* (2006.01)
*H04B 7/0413* (2017.01)

(58) Field of Classification Search
CPC ........ H01Q 21/28; H01Q 21/26; H01Q 23/00;
H01Q 9/065; H01Q 9/28; H04B 7/0413
See application file for complete search history.

(56) References Cited

FOREIGN PATENT DOCUMENTS

| | | |
|---|---|---|
| CN | 106207444 A | 12/2016 |
| CN | 206076502 U | 4/2017 |
| KR | 10-1304929 B1 | 9/2013 |

\* cited by examiner

INTEGRATED ANTENNA UNIT, MULTI-ARRAY ANTENNA, TRANSMISSION METHOD AND RECEIVING METHOD OF SAME

TECHNICAL FIELD

This application generally relates to the field of communication system, and particularly, to an integrated antenna unit and a multi-array antenna of the same.

BACKGROUND ART

In traditional phased-array antennas, a set of radiating elements (known as sub-arrays) are combined in the vertical plan to boost more gain. Also, a cavity backed component such as filter, phase shifter, amplifier or attenuator is generally used at the back of the whole antenna with number of outputs same as the number of sub-array ports with additional connectors. And the inputs of the cavity-backed component are connected to a number of Transmitting/Receiving circuits (from RRU); which heavily increase antenna dimension and complexity of feed line since the multiple sub-arrays impose to have additional power splitters to be with feed lines. Also, it can be noted extra weight and cost with multiple cavities and additional connectors and wasted space between radiating surface and antenna reflector due to the fact that existing design is having balun being supported by a fixture structure. In addition, this imposes costly development and implementation resources as multiple soldering points between radiating elements, power splitters and feeding network.

Technical Problem

A main object of the present invention is to provide an antenna unit, which can simplify the antenna-array structure, improve the antenna capacity and exploitation with good radiating performance.

A secondary object of the present invention is to provide a multi-array antenna, which can obtain a Massive MIMO antenna.

A further object of the present invention is to provide an antenna-RF component integrated transmission method.

A final object of the present invention is to provide an antenna-RF component integrated receiving method.

Solution to Problem

Technical Solution

To obtain the above object, an integrated antenna unit provided in the present invention comprising: an integrated radiating element; a reflect board beneath the integrated radiating element without a direct contact therebetween; and an RF component device for processing signal of interest for a radio unit. The RF component device is placed beneath the integrated radiating element and on the reflecting board, and serves a support of a fixture structure of the radiating element to the reflecting board; whereby a space between the radiating element and the reflecting board can be efficiently used for the RF component device.

In some embodiments, the RF component device can be one of a phase shifter, a filter, an amplifier, and an attenuator; the radiating element is dual-polarization, single-polarization, or circular polarization.

In some embodiments, the integrated radiating element comprises a balun and a radiating surface separately coupled to each other; the integrated antenna unit further comprises a compact board to hold the balun.

In some embodiments, the same baluns are set in the same plan; the radiating surface is integrated with the compact board.

In some embodiments, a transmission line is attached on the compact board serving the balun.

In some embodiments, the transmission lines on the compact board topology and its length are tuned to match 50 or 75 Ohm impedance of each radiating element.

In some embodiments, the compact board is made from any type PCB materials, and its length and thickness are tuned to match a desired band range of interest signal.

In some embodiments, the compact board has one or two substrates.

In some embodiments, the balun comprises two parts: a first part where the transmission line attached on the compact board serves a primary balun for one polarization; a second part where the transmission line is attached on the compact board serving a secondary balun for the other polarization.

In some embodiments, the primary balun is printed on a primary substrate located on top of the radiating surface; the secondary balun is printed on a secondary substrate located at a bottom of the radiating surface; the primary substrate and the secondary substrate construct the compact board; and the radiating surface is placed between the primary substrate and the secondary substrate.

In some embodiments, the primary balun and the secondary baluns are overlapped with a fly-over structure and attached on the same plan of the compact board; two baluns are not intersect with each other; and one of the baluns is broken, and re-connect with a 0-Ohm resistor, patch or wire.

In some embodiments, the overlapped baluns and the radiating surface are located at opposite surface of the compact board.

In some embodiments, the transmission line is attached on a top surface of the compact board serves the balun for a single polarization; the radiating surface is attached on a bottom surface of the compact board.

In some embodiments, the RF component device at least has one input and one output; the output of the RF component device directly connected with the balun.

In some embodiments, the RF component device comprise a primary RF component and a secondary RF component each with one output directly connected with the primary balun and the secondary balun; the connection can be made of any transmission mean traversing the primary and secondary substrates via hole.

In some embodiments, the primary and secondary RF components can be housed in same box sharing same cavity or housed in separate boxes with different cavity; the parameter adaptation is adapted for a size and processing performances requested by the base station radio module.

In some embodiments, the reflecting board is placed below the integrated radiating element with two side walls running parallel; a height of the side walls can be tuned to control desired 3 dB azimuth beam of the radiating elements.

To obtain the above object, a multi-array antenna provided in the present invention comprising: multiple antenna units, the multiple antenna units are supported on the reflecting board, and two running side wall enclose the antenna units therebetween.

In some embodiments, the multi-array antenna has multiple band-pass filters as the RF component, the multiple band-pass filters are connected to a radio unit thus to form a multi-array active antenna.

To obtain the above object, an antenna-RF component integrated transmission method comprises: proceeding signal of interest from a base station antenna transmitting path by a primary RF component; sending an output of the primary RF component to a primary balun; coupling an input signal by the primary balun into through a primary substrate and exciting a corresponding radiating surface through coupling mechanism; and radiating a first polarized wave throughout the space.

To obtain the above object, an antenna-RF component integrated transmission method comprises: proceeding signal of interest from a base station antenna transmitting path by a secondary RF component; sending an output of the secondary RF component to a secondary balun; coupling an input signal of the secondary balun into through the primary substrate and exciting a corresponding radiating surface through coupling mechanism; and radiating a second polarized wave throughout the space.

To obtain the above object, an antenna-RF component integrated receiving method provided in the present invention comprising: sending received polarized wave to a primary balun by an integrated radiating element; forwarding output of the primary balun to a primary RF component which proceeds signal of interest; and sending signal of interest to a base station antenna receiving path.

To obtain the above object, an antenna-RF component integrated receiving method, provided in the present invention comprising: sending received polarized wave to a secondary balun by a radiating element; forwarding the output of the secondary balun to a secondary RF component which proceeds signal of interest; and sending signal of interest to a base station antenna receiving path.

Advantageous Effects of Invention

Advantageous Effects

In accordance with the embodiments, the present invention has advantages that: a compact antenna element unit can be obtained since the radiating elements are integrated with a compact printed board; further, the baluns of two polarizations respectively set on a separated board contributes much in terms of inter-port isolation, ease of antenna feeding drawing, a stable pattern beamwidth and high-gain. And a compact sized of the antenna can be obtained.

Further, the antenna unit has a simple structure and high capacity because of the compact antenna element, and the space between the radiating elements and the reflecting board can be used efficiently by adding a compact band-pass filter therebetween, and cost effective compact integrated antenna unit can be obtained which is also easy to manufacture especially.

A large scale MIMO antenna is to be produced as there are less soldering parts and reduced connectors.

The above-mentioned features, as well as other features, aspects, and advantages of the present technology will now be described in connection with various embodiments of the invention, in reference to the accompanying drawings. The illustrated embodiments, however, are merely examples and are not intended to limit the invention.

BEST MODE FOR CARRYING OUT THE INVENTION

Best Mode

The provided figures and the following description of certain embodiments of the invention are not intended to limit the invention to these embodiments, but rather, are provided to enable any person skilled in the art to make and use this invention.

Figure 1:
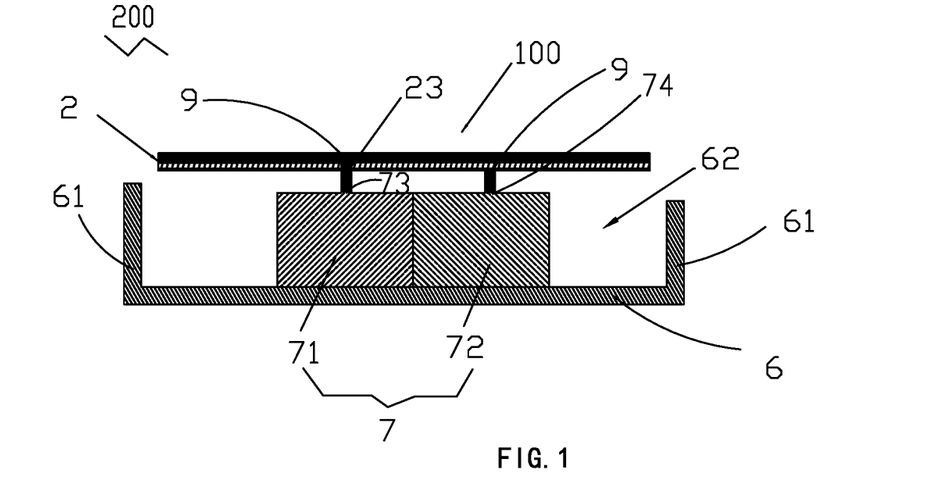
FIG. 1 illustrates a cross-sectional view of an integrated antenna unit in accordance with an embodiment of the present invention.
Figure 2:
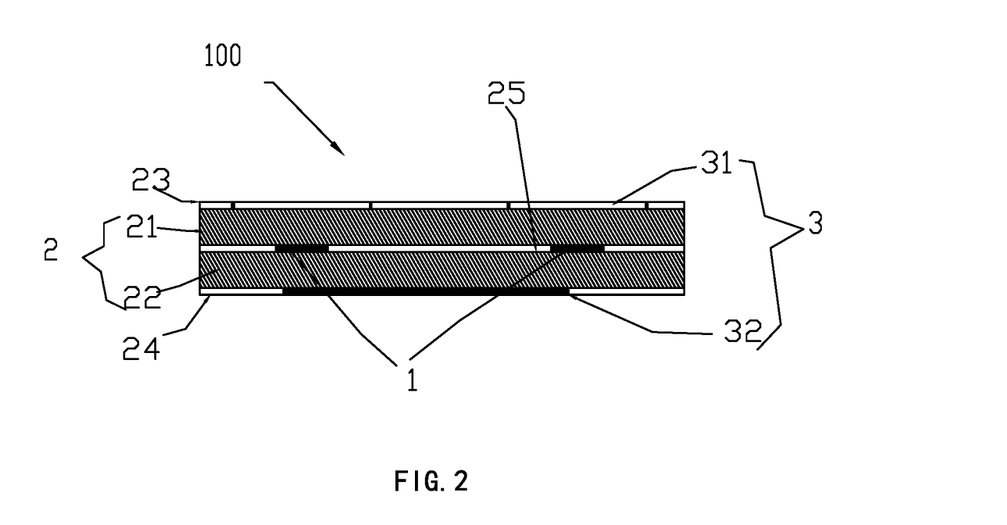
FIG. 2 illustrates a cross-sectional view of an integrated radiating element in accordance with one embodiment of the present invention.
Figure 3:
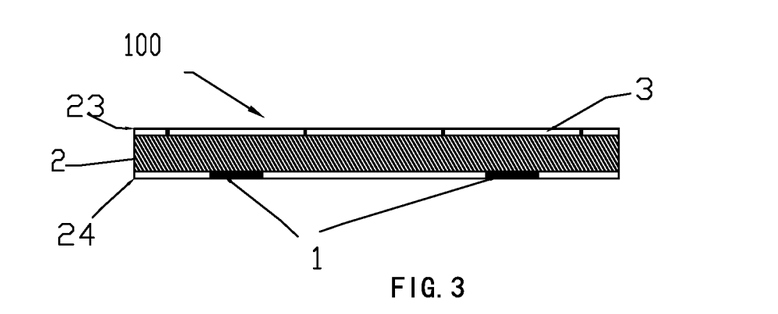
FIG. 3 illustrates a cross-sectional view of an integrated radiating element in accordance with another embodiment of the present invention.

Referring to FIGS. 1-3, an integrated antenna unit 200 is proposed in accordance with one embodiment of this invention, comprise an integrated radiating element 100 integrated with a compact board 2, a reflect board 6 beneath the integrated radiating element 100, and an RF component device 7 fixed on the reflecting board 6 and beneath the radiating element 100. The RF component device 7 is accommodated in a space 62 between the radiating element 100 and the reflecting board 6, and supports the radiating element 100 without extra fixture structure. The RF component device 7 can be phase shifter, filter, amplifier, attenuators, or others. The RF component device 7 is used to process signals from a base station antenna transmitting path or from the radiating element 100.

The integrated radiating element 100 comprises a balun 3 and a radiating surface 1 integrated on the compact board 2. The compact board 2 can be manufactured from any type existing PCB materials and its length and thickness can be tuned to match the desired range of interest, and at least has one substrate. Other substrate materials adapted for the radiating element can also be used. The compact board 2 has a top surface 23 and an opposite bottom surface 24, and can be one-layer structure (as shown in FIG. 3); or can be two-layer structure (as shown in FIG. 2), denoted as a primary substrate 21 and a secondary substrate 22 each with an inner surface 25 opposite. The integrated radiating element 100 as shown in FIG. 2 has the compact board 2 composed of two layers of PCB 21, 22, also denoted as a top PCB 21 and a bottom PCB 22 using the same reference number of the substrate, each with the inner surface 25 overlapped. While in FIG. 3, the integrated radiating element 100 has one-layer PCB 2.

The balun 3 is coupled to the radiating surface 1. In this invention, a transmission line or feed line is printed or attached to the compact board 2 serving balun 3 for radiating elements.

Figure 10:
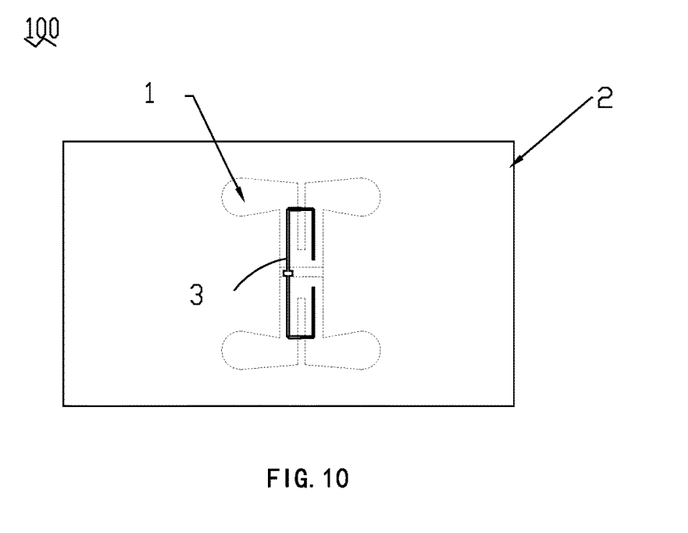
FIG. 10 illustrates a perspective view of the integrated radiating element in accordance with one embodiment of the present invention.

In some embodiments, referring to FIGS. 3 and 10, the balun 3 can be a single balun for a single polarization or a circular polarization to which a dual-feed balun with one feed having 90 degree offset phase is applied. In this case, the one-layer compact board 2 is applicable.

Figure 4:
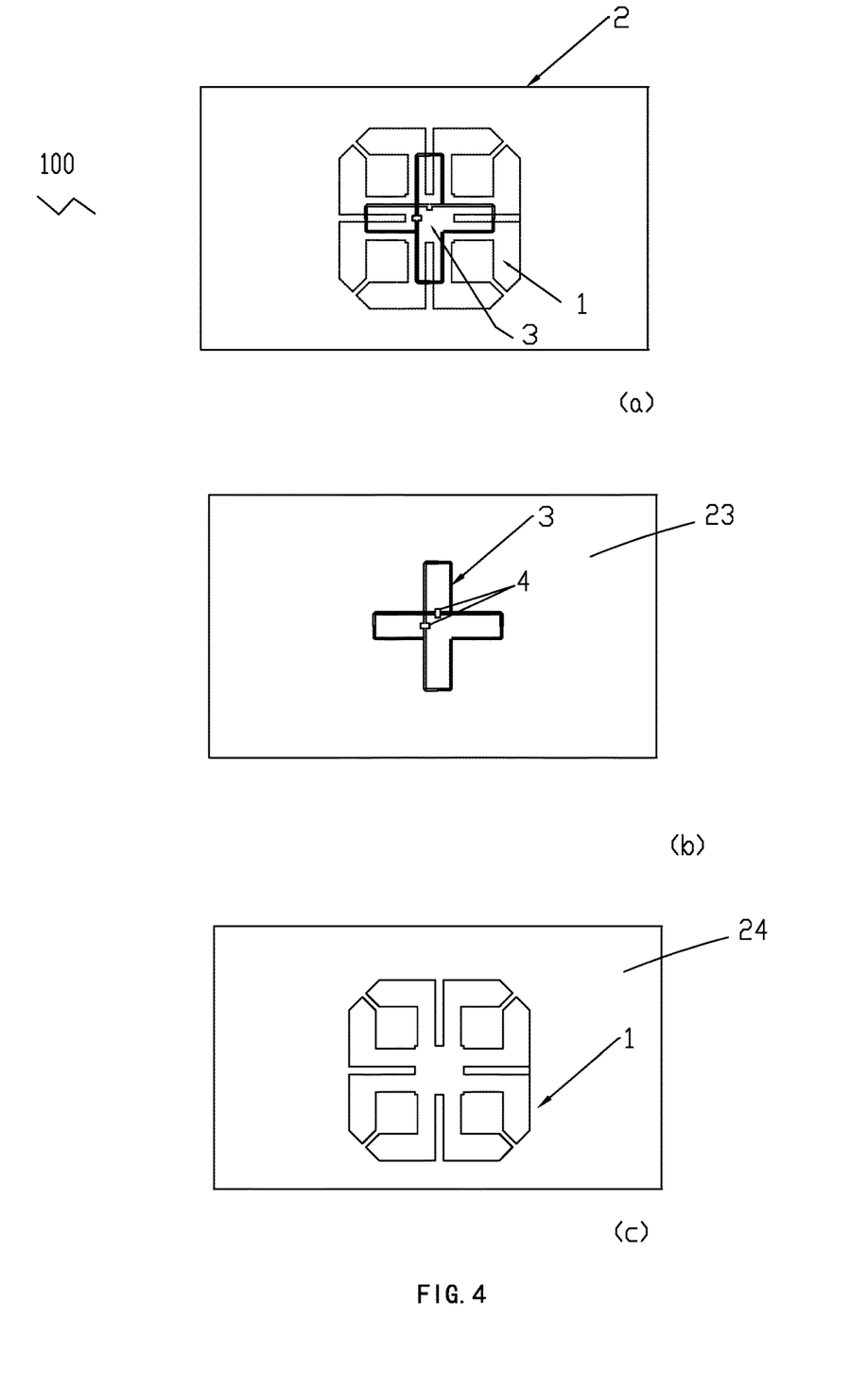
FIG. 4 illustrates an integrated radiating element in accordance with one embodiment of the present invention, where (a) represents a perspective view thereof, (b) a top plan view thereof, and (c) represents a bottom view thereof.
Figure 5:
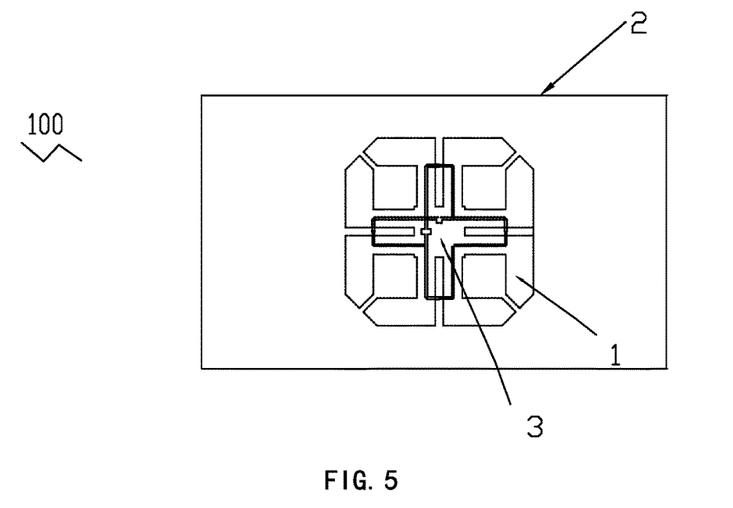
FIG. 5 illustrates a schematic diagram of the integrated radiating element of dual polarization in accordance with one embodiment of the present invention.
Figure 6:
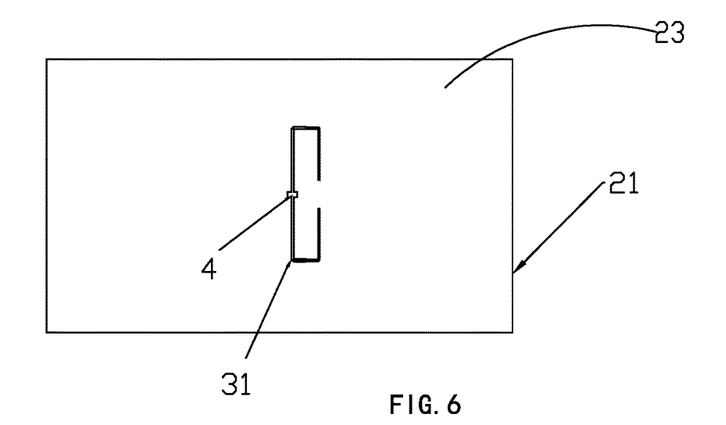
FIG. 6 illustrates a plan view of the radiating element in accordance with one embodiment of the present invention.
Figure 7:
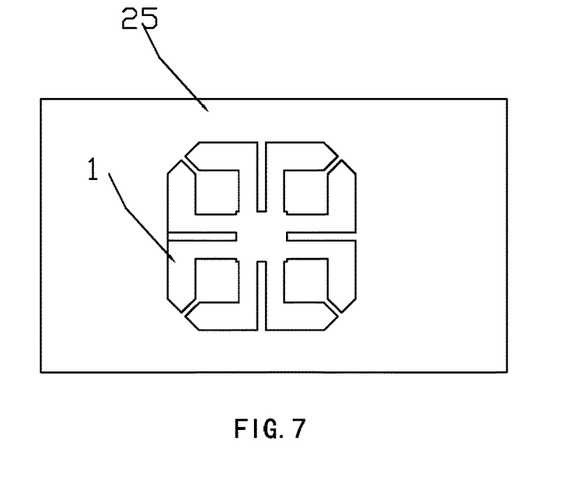
FIG. 7 illustrates a plan view of an inner surface of the radiating element in accordance with one embodiment of the present invention.
Figure 8:
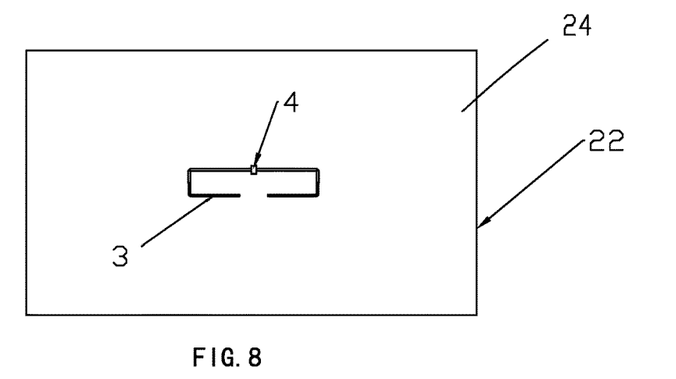
FIG. 8 illustrates a rear view of the radiating element in accordance with one embodiment of the present invention.

In other embodiments, the balun 3 comprise a primary balun 31 and a secondary balun 32 each for one radiating element of dual-polarization as shown in FIGS. 4-9. In some embodiments, the primary and secondary baluns 31 and 32 each is separately set at one of the two-layer PCB 21, 22 (as shown in FIGS. 6 and 8) for a good isolation of each port.

Figure 9:
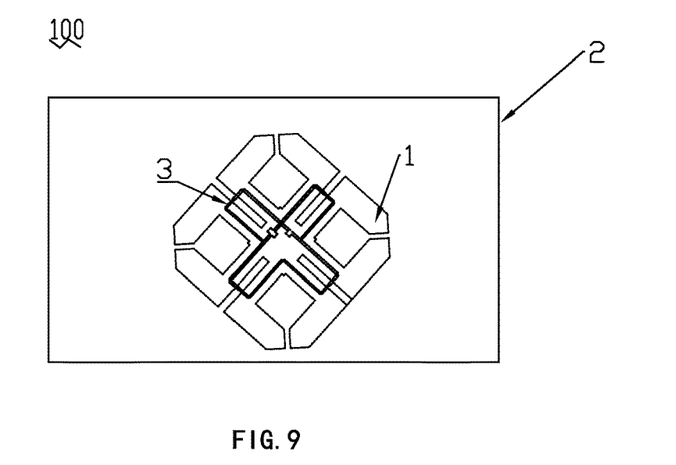
FIG. 9 illustrates a perspective view of the integrated radiating element in accordance with one embodiment of the present invention.

In other embodiments, the primary and secondary baluns 31 and 32 can be set on the same plan, such as at the same top surface 23 of the compact board 2 while the radiating surface 1 can be printed on the bottom surface 24 or inner surface 25 of the compact board 2. Referring to FIGS. 4(*a*), 5 and 9. In this case, the one-layer compact board 2 can be applicable where the balun 3 and the radiating surface 1 are each attached to the bottom surface 24 and the inner surface 25 of the compact board 2. And further in other embodiments, the two-layer compact board 2 composed of PCBs 21 and 22 can also be applicable, where the radiating surface 1 can be attached to the bottom surface 24 or the inner surface 25 while the balun 3 is set on the top surface 23.

The radiating surface 1 of a radiating element is printed or attached to one surface of the compact board 2, such as the bottom surface 24 or the inner surface 25; where the shape and structure of radiating surface is not limited and can be any type such as circular, square, polygon etched shape. The radiating element structure and shape is not limited and half-wave is given as matter of illustration. The radiating surface 1 is spaced from the balun 3, and comprises radiating arms (not labeled) adapted for radiating elements of the radiating element. The balun 3 is coupled to the radiating surface 1 to form the radiating elements.

In some embodiments, the radiating surface 1 is printed between two PCBs 21 and 22 in a sandwich-like scheme, as shown in FIG. 2, can be attached such as by printing or etching on any inner surface 25 of the two-layer compact board 2. In other embodiments, the radiating surface 1 is attached such as by printing or etching on the bottom surface 24 of the compact board 2 of one-layer structure (as shown in FIG. 3) or two-layer structure.

Each balun 31, 32 is connected to a transmission line 9 traversing the compact board 2 through hole 23; where the output of the transmission line is connected to RF component device 7 processing signal of interest for a radio unit (not shown). The transmission line 9 can be used to support the integrated radiating element 100.

The following illustrates more detail of various embodiments of the integrated radiating element 100 of the present invention.

In a first embodiment, an integrated antenna unit 200 comprises a dual-polarized radiating element 100 with one radiating element for each polarization. Each radiating element is composed of radiating surface 1 and a balun 3.

The radiating surface 1 of a radiating element is printed between two PCB boards 21 and 22 (sandwich-like scheme); where the shape and structure of radiating surface is not limited and can be any type such as circular, square, polygon etched shape. The radiating element structure and shape is not limited and half-wave is given as matter of illustration.

In some embodiments, referring to FIGS. 4(*a*)-(*c*) which illustrates a radiating element 100 of dual polarization, the balun 3 can be composed of two parts: the first part composed of the compact board 2 where a transmission line or feed line is printed serving the primary balun 31 for one polarization of dual-polarization, and the second part composed of the compact board 2 where a transmission line or feed line is printed serving secondary balun 32 for the other polarization. Two baluns 31, 32 are placed on same surface of the board 2. In this case, the two balun (feed lines) 31, 32 are overlapped with a fly-over structure so as to make sure that the two lines are not intersect. In an embodiment, one of the feed line is broken and re-connected with a 0-Ohm resistor, patch or wire 4; and the compact board 2 can only have one substrate as shown in FIG. 3, where the baluns 31, 32 are attached on a top surface 23 and the radiating surface 1 is attached on an opposite bottom surface 24 of the compact board 2.

In other embodiments, referring to FIGS. 5-8 together, the balun 3 can be composed of two parts: a first part composed of a primary substrate 21 located on top of the radiating surface 1 where a transmission line is printed serving primary balun 31 for one polarization; a second part composed of a secondary substrate 22 located at bottom of the radiating surface 1 where a transmission line is printed serving secondary balun 32 for the other polarization. In this case, both the primary substrate 21 and the secondary substrate 22 construct the compact board 2. The radiating surface 1 is placed between the primary substrate 21 and the secondary substrate 22.

The dual-polarized radiating element 100 is connected between two PCBs 21 and 22 serving as balun support of the two polarizations. The first polarization has its balun 31 located on top of the upper PCB board 21, denoted as the primary balun 31 while the second one has it at the bottom of the lower board 22, denoted as secondary balun 32. And the baluns 31, 32 are on same plan as the radiating element. The fact of having the primary and secondary baluns 31, 32 printed on a separated board 21, 22 contributes much in terms of inter-port isolation.

Figure 12:
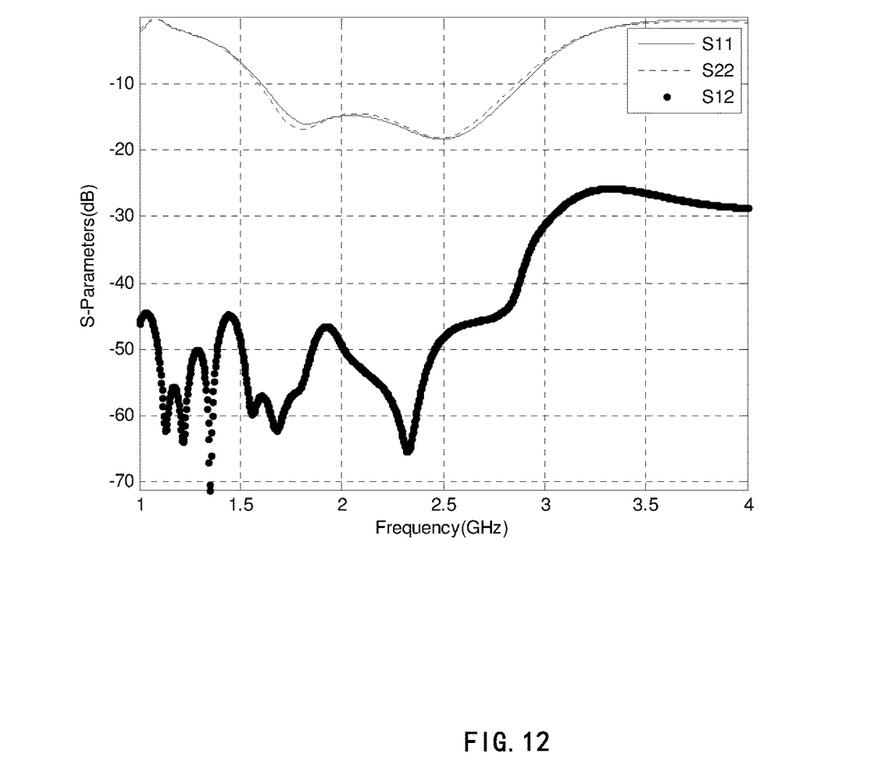
FIG. 12 represents the S-parameters of one radiating element (radiating surface with layered-balun) in accordance with an embodiment of the present invention.

The transmission lines on top of the primary and secondary substrates topology and its length can be tuned to match 50 or 75 Ohm impedance of each radiating element. As matter of illustration, particular rectangular line is used to output bandwidth of more than 44% when a return loss less than −14 dB is required covering 1710-2690 MHz with good inter-port isolation, stable pattern beamwidth and high-gain for each polarization, as shown in FIG. 12, which represents S-parameter of compact radiating element (radiating surface with layered-balun). Other balun topology can be adopted also with quarter wave transformers to match impedance at desired frequency range.

The primary and secondary substrates 21, 22 can be manufactured from any type existing PCB materials and its length and thickness can be tuned to match the desired range of interest. Two substrates layers 21, 22 are used to hold the two baluns 31, 32, which leads to a better isolation.

In other embodiments as shown in FIG. 4, the two-baluns 31, 32 can be printed on same PCB board acting as substrate. The whole integrated radiating element 100 will only need one PCB layer. In this case, the two baluns (feed lines) 31, 32 are overlapped. And one of the feed line is broken and re-connect the line with a 0-Ohm resistor (low loss line), patch or wire 4. In this embodiment, the two baluns 31, 32 are placed on the same PCB board. And the whole antenna structure 200 will only need one substrate 2. In this case, the two balun 31, 32 (feed lines) are overlapped with the feed line being broken and re-connected with a 0-Ohm resistor, patch or wire.

The integrated radiating element 100 as shown in FIG. 9 is ±45° polarization. The primary and secondary baluns 31, 32 can be printed on a separated board 21, 22; where similarly, the first polarization has its balun 31 located on top of the upper PCB board 21, while the second one has it at the bottom of the lower board 22. And the baluns 31, 32 are on same plan as the radiating element. As another embodiment, two baluns 31, 32 can also be placed on the same PCB boardin a fly-over structure, and are overlapped with the feed line being broken and re-connected with a 0-Ohm resistor, patch or wire. The two baluns 31, 32 are spaced from the radiating surface 1.

The integrated radiating element 100 as shown in FIG. 9 is a single polarization, where the balun 3 is a single balun for a single polarization, and is printed on a top surface of compact board 2 while the radiating surface 1 is printed on the bottom surface of the compact board 2.

In other embodiment, a circular polarization (not shown) to which a dual-feed balun 3 with one feed having 90 degree offset phase is applied. In this case, the one-layer compact board 2 is applicable.

Referring FIG. 1 again, in the antenna unit 200 of the present invention, the reflecting board 6 is placed below the compact radiating unit 100 with two side walls 61 running parallel enabling to control the 3 dB azimuth beam generated by the radiating elements 10.

The RF component device 7 at least has one input and one output (not labeled) directed connected with the balun 3. As for a dual-polarized or circular radiating element 100, the RF component device 7 comprises a primary and secondary RF components 71, 72 each has one input and one output connected with each balun 31, 32 for each radiating element.

It is understood, as for a single polarization, the RF component device 7 has one RF component with one input and one output directly connected with the single balun 3.

In one embodiment as shown in FIG. 1, the RF component device 7 comprises a primary RF component 71 and secondary RF component 72. The primary RF component 71 has one input (not shown) and one output 73 is placed beneath the integrated radiating element 100. The primary RF component 71 serves support of the fixture structure of the radiating element 100 to the reflecting board 6. And its output 73 is connected directly to the primary balun 31. The connection can be made of cable or any transmission mean 9 traversing the primary and secondary substrates 21 and 22 via hole 23.

The secondary RF component 72 has one input (not shown) and one output 74 is placed beneath the radiating element 100. The secondary RF component 72 also serves support of the fixture structure of the radiating element 100 to the reflecting board 6. And its output 74 is connected directly to the secondary balun 32. The connection can be made of cable or any transmission mean 9 traversing the primary and secondary substrates 21 and 22 via hole 23.

In some embodiments, the RF component device 7 is a filtering device which keeps filtered signal of interest which is received from a base station antenna transmitting path or can be forwarded to a base station antenna receiving path. The RF component can be band-pass filter in accordance with some embodiments. FIG. 12 illustrates integrated antenna return loss where a 60 MHz band-pass filter with insertion loss less than 1 dB is used as RF component device.

The primary and secondary RF components 7 can be housed in same box sharing same cavity or housed in separate boxes with different cavity. The parameter adaptation depends on the size and processing performances requested by the base station radio module.

The integrated antenna unit 200 is proposed in accordance with one embodiment of this invention, where a radiating element 100 is connected between two PCB boards 21, 22 or is attached to a single PCB serving as balun support of the two polarizations. And the baluns 31, 32 are on same plan as the radiating element.

Figure 13:
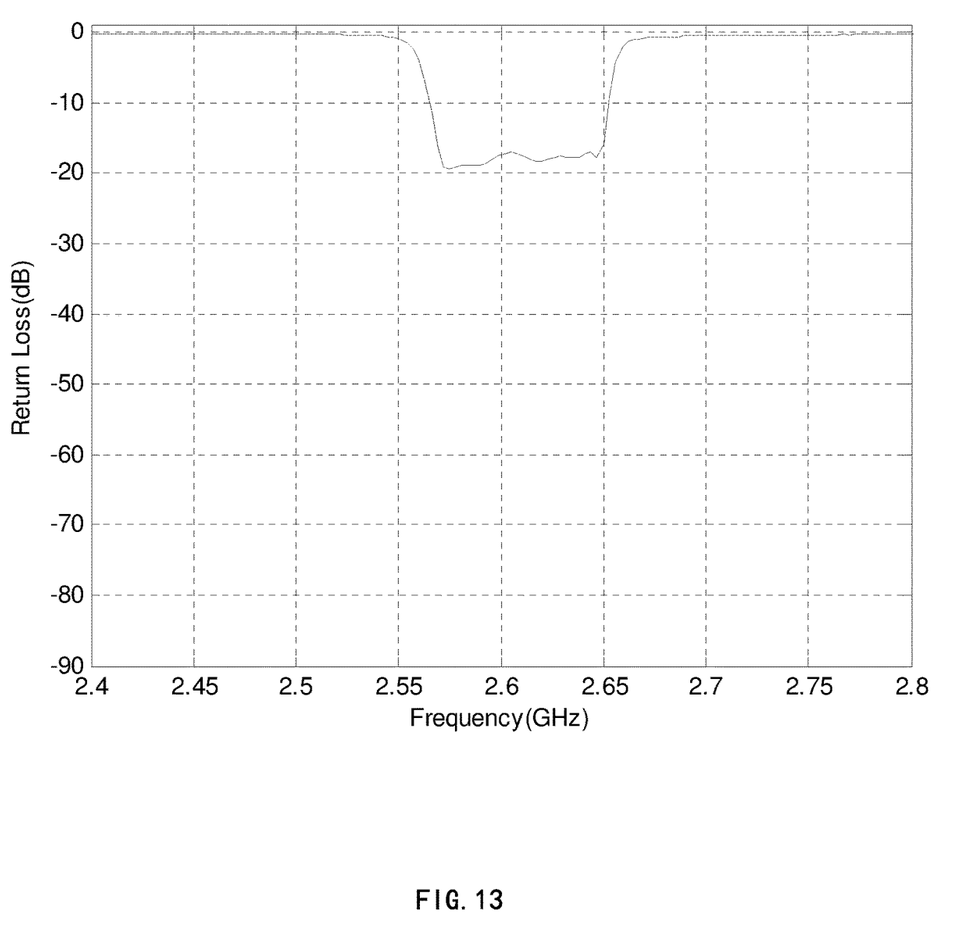
FIG. 13 represents a return loss of a compact radiating element with filter integrated for one polarization in accordance with an embodiment of the present invention.

There is no direct contact between the radiating element 100 and its grounding plan (reflecting board) 6. So, the space 62 between the radiating element 100 and the reflecting board 6 can be used for RF component device 7 such as phase shifter, filter, amplifier, attenuators. Each balun 31, 32 is connected to a transmission line 9 traversing the PCB boards 21, 22 through hole 23; where the output of the transmission line is connected to RF component device 7 processing signal of interest for a radio unit (not shown). The RF component device 7 is placed beneath the radiating element 100. A reflecting board 6 is placed around ¼ wavelength of the radiating element 100 where also the RF component device 7 can be fixed. Interestingly, the space 62 between the radiating elements 10 and the reflecting board 6 can be used efficiently and the back 60 of the reflecting board can be used as support of other components for an active antenna array. So cost effective integrated unit 200 is obtained which is also easy to manufacture especially when large scale active antenna array is to be produced as there are less soldering parts and reduced number of connectors. FIG. 12 shows an S-parameter of compact radiating element 100 (radiating surface with layered-balun) in accordance with the embodiments of the present invention. FIG. 13 shows a return loss of the compact radiating element with filter integrated for one polarization. Both charts show a good radiating performance of the radiating element of the present invention.

Figure 11:
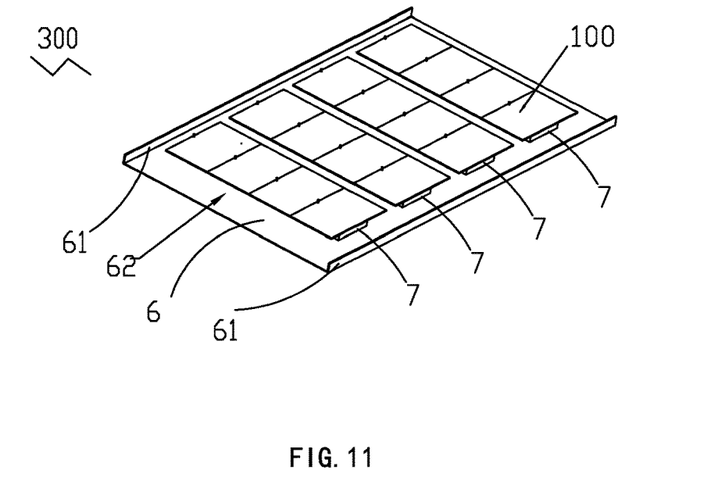
FIG. 11 illustrate a perspective view of a large-scale array in accordance with one embodiment of the present invention.

Referring to FIG. 11, a large-scale array antenna 300 proposed in accordance with an embodiment of the present invention is obtained by collocating several above integrated radiating elements 100, each radiating elements 100 forms a sub-array. Multi-array integrated radiating element 100 is supported on the extended reflecting board 6 each by one RF component device 7. Thus the MIMO antenna 300 has multiple RF component device 7 each processing signal of interest for a radio unit. The extended reflecting board 6 has two parallel side walls 61 running upwards to enclose all the integrated radiating element 100 therebetween.

Further, the inputs of the multiple band-pass filters 7 can be connected to a radio unit; so that multi-array active antennas can be obtained.

An antenna-RF component integrated transmission method, where a primary RF component 71 proceeds signal of interest from a base station antenna transmitting path. The output 73 of the primary RF component 71 is sent to the primary balun 31. And the primary balun 31 couples its input signal into through the primary substrate 21 and excites the corresponding radiating surface 1 through coupling mechanism. A first polarized wave is radiated throughout the space.

An antenna-RF component integrated transmission method, where a secondary RF component 72 proceeds signal of interest from a base station antenna transmitting path. The output 74 of the secondary RF component 72 is sent to the secondary balun 32. And the secondary balun 32 couples its input signal into through the primary substrate 21 and excites the corresponding radiating surface 1 through coupling mechanism. A second polarized wave is radiated throughout the space.

An antenna-RF component integrated receiving method, where a radiating element 100 sends its received polarized wave to the primary balun 31. The output of the primary balun 31 is forwarded to the primary RF component 71 which proceeds signal of interest that can be sent to a base station antenna receiving path.

An antenna-RF component integrated receiving method, where a radiating element sends its received polarized wave to the secondary balun 32. The output of the secondary balun 32 is forwarded to the secondary RF component 72 which proceeds signal of interest that can be sent to a base station antenna receiving path.

As used in the description and claims, the singular form "a", "an" and "the" include both singular and plural references unless the context clearly dictates otherwise. At times, the claims and disclosure may include terms such as "a plurality," "one or more," or "at least one;" however, the absence of such terms is not intended to mean, and should not be interpreted to mean, that a plurality is not conceived.

As used herein, the term "comprising", "comprises" or "composed of" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed invention. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. An integrated antenna unit comprising:
    an integrated radiating element comprising:
        a primary balun;
        a secondary balun in a same plan as the primary balun;
        a compact board that holds the primary balun and the secondary balun; and
        a radiating surface integrated with the compact board and coupled to the primary balun and the secondary balun;
    a reflect board beneath the integrated radiating element without a direct contact therebetween; and
    an RF component device that is: disposed beneath the integrated radiating element and on the reflecting board in a space between the radiating element and the integrated reflecting board; configured to process a signal of interest for a radio unit; and
    supporting a fixture structure of the integrated radiating element to the reflecting board.

2. The integrated antenna unit according to claim 1, wherein the RF component device is one of a phase shifter, a filter, an amplifier, or an attenuator; and the integrated radiating element is dual-polarization, single-polarization, or circular polarization.

3. The integrated antenna unit according to claim 1, wherein a transmission line or feed line serving the primary balun and secondary balun is attached on the compact board.

4. The integrated antenna unit according to claim 3, wherein the transmission line has a topology and length tuned to match 50 or 75 Ohm impedance of the integrated radiating element.

5. The integrated antenna unit according to claim 1, wherein the compact board is made from any type PCB material, and its length and thickness are tuned to match a desired band range of an interest signal.

6. The integrated antenna unit according to claim 1, wherein the compact board comprises one or two substrates.

7. The integrated antenna unit according to claim 3, wherein a first part where the transmission line attached on the compact board serves the primary balun for a first polarization; and a second part where the transmission line is attached on the compact board serves the secondary balun for a second polarization different from the first polarization.

8. The integrated antenna unit according to claim 7, wherein the primary balun is printed on a primary substrate located on top of the radiating surface; the secondary balun is printed on a secondary substrate located at a bottom of the radiating surface; the primary substrate and the secondary substrate constitute the compact board; and the radiating surface is placed between the primary substrate and the secondary substrate.

9. The integrated antenna unit according to claim 7, wherein the primary balun and the secondary baluns are overlapped with a fly-over structure so that they do not intersect with each other; the primary balun and secondary balun are attached on a same plan of the compact board; and one of the primary balun and secondary balun is broken, and reconnected with a 0-Ohm resistor, patch or wire.

10. The integrated antenna unit according claim 9, wherein the primary balun and secondary balun, and the radiating surface are respectively located at opposite surfaces of the compact board.

11. The integrated antenna unit according to claim 3, wherein the transmission line is attached on a top surface of the compact board and serves the primary balun and secondary balun for a single polarization; and the radiating surface is attached on a bottom surface of the compact board.

12. The integrated antenna unit according to claim 2, wherein the RF component device at least has one input and one output; and the output of the RF component device directly connected with the primary balun and secondary balun.

13. The integrated antenna unit according to claim 12, wherein the RF component device comprises a primary RF component and a secondary RF component each with one output directly connected with the primary balun and the secondary balun via holes in the compact board.

14. The integrated antenna unit according to claim 13, wherein the primary and secondary RF components are configured to be housed in a same box sharing a same cavity or housed in separate boxes with different cavities; and a parameter adaptation of the RF component device is configured for a size and processing performance requested by the radio unit.

15. The integrated antenna unit according to claim 2, wherein the reflecting board is disposed below the integrated radiating element with two side walls running parallel; and a height of the side walls is configured to be tuned to control desired 3 dB azimuth beam of the integrated radiating element.

16. A multi-array antenna comprising multiple antenna units according to claim 1, wherein the multiple antenna units are supported on the reflecting board and located between two running side walls thereof.

17. The multi-array antenna according to claim 16, wherein the multi-array antenna has multiple band-pass filters as the RF component, and the multiple band-pass filters each are connected to the radio unit to form the multi-array active antenna.

18. An integrated antenna unit comprising:
an integrated radiating element comprising:
   a primary balun having a first polarization;
   a secondary balun having a second polarization different from the first polarization;
   a compact board that holds the primary balun and the secondary balun;
   a transmission line that serves the primary balun and the secondary balun; and
   a radiating surface coupled to the primary balun and the secondary balun;
a reflect board beneath the integrated radiating element without a direct contact therebetween; and
an RF component device that is: disposed beneath the integrated radiating element and on the reflecting board in a space between the integrated radiating element and the integrated reflecting board; configured to process a signal of interest for a radio unit; and
supporting a fixture structure of the integrated radiating element to the reflecting board.

19. An integrated antenna unit comprising:
an integrated radiating element comprising:
   a balun;
   a compact board that holds the balun;
   a transmission line serving the balun for a single polarization, the transmission line being attached on a top surface of the compact board; and
   a radiating surface coupled to the balun and attached on a bottom surface of the compact board;
a reflect board beneath the integrated radiating element without a direct contact therebetween; and
an RF component device that is: disposed beneath the integrated radiating element and on the reflecting board in a space between the integrated radiating element and the integrated reflecting board; configured to process a signal of interest for a radio unit; and supporting a fixture structure of the integrated radiating element to the reflecting board.

* * * * *